United States Patent [19]

Eckhardt et al.

[11] Patent Number: 5,572,340
[45] Date of Patent: Nov. 5, 1996

[54] PRE-PRESS PROCESS AND SYSTEM FOR ACCURATELY REPRODUCING COLOR IMAGES

[76] Inventors: Richard Eckhardt, 51 Lockeland Ave., Arlington, Mass. 02174; Jerry B. Roberts, 15 Pine Ridge Rd., Arlington, Mass. 02174

[21] Appl. No.: 284,886

[22] Filed: Aug. 2, 1994

[51] Int. Cl.⁶ .............................. H04N 1/56; H04N 1/60
[52] U.S. Cl. .............................. 358/518; 358/519
[58] Field of Search .............................. 358/504, 518, 358/519, 520, 521, 523, 527; 382/167

[56] References Cited

U.S. PATENT DOCUMENTS

| | | | |
|---|---|---|---|
| 4,561,016 | 12/1985 | Jung et al. | 358/527 |
| 4,839,721 | 6/1989 | Abdulwahab et al. | 358/518 |
| 4,965,663 | 10/1990 | Sasaki | 358/504 |
| 5,317,425 | 5/1994 | Spence et al. | 358/504 |

Primary Examiner—Scott A. Rogers
Attorney, Agent, or Firm—Lappin & Kusmer LLP

[57] ABSTRACT

A pre-press process employs color accurate instant photography so that the customer and/or his photographer adjust lighting and exposure at the photography session to achieve approved reflection originals. The photographs are judged under controlled lighting against a standard background in device such as a portable illuminator. Since any deficiencies are corrected by recreating an improved original, the session produces a job output which is 100% suitable for color accurate scanning and separation without the intervention of the pre-press operator. Originals are suitable as proofs for the printer to match. Novel means are employed to achieve rapid, colorimetrically calibrated scanning with standard equipment, and the colorimetry of the prior art is improved to deal effectively with whitepoint and blackpoint misalignment.

11 Claims, 1 Drawing Sheet

PRE-PRESS PROCESS AND SYSTEM FOR ACCURATELY REPRODUCING COLOR IMAGES

FIELD OF THE INVENTION

The present invention relates generally to apparatus for and methods of automated pre-press for color printing, and more particularly to apparatus for and methods of automatically generating a color accurate printed facsimile of a reflection input color image.

BACKGROUND OF THE INVENTION

Color printing typically involves interaction between a customer, a photographer, a pre-press house, and a printer. The process generally begins with a photography session or "photo-shoot", during which photographs of the desired scene are taken. The photographic film typically used is of the type for producing color transparencies, or slides, because using negatives with color prints would add an extra level of complexity, loss of sharpness and color distortion to the process. Once approved, the developed transparencies are then sent to the pre-press house where the required color separation process is performed and a set of film, typically one for each subtractive color (cyan, magenta, yellow and black), known as half-tones are produced. The acceptability of the color separation can be checked by producing a positive proof from the half-tone films. The positive proof is indicative of how the final printed product will look. Typically, the positive proof is not produced by an offset press because of the substantial cost of configuring the offset press, which is usually only justified if it is determined in advance that the customer will be satisfied with the printed product. Instead the proofs are often produced by a manual process requiring semi-skilled labor and costs of materials. If the customer approves the proof, then the half-tones are sent to the printer. If the proof is not acceptable, then the color separation must be redone with new parameters, or alternatively, a new photo-shoot is required. The proof becomes a contract specification for the printer, i.e. the printer must match the final print to the proof.

One problem with this process is that it requires skilled craftsmen at the pre-press house to make a subjective judgment, typically through an iterative process, to achieve what they consider to be a good color reproduction of the photographic original (the transparency) taking into account corrections requested, or presumed to be desired, by the customer. Another problem is that the color separation process is expensive and requires expensive equipment, e.g., expensive scanners for scanning the slides. Yet another problem with this process is that the proof of half tones is not available for review and approval by the customer until well after the photo-shoot photography session. Since slight errors of lighting or exposure can produce small but unacceptable color cast or tonal errors, even the best of several shots of the same subject often requires correction in the scanning and separation process. Such editorial improvements upon the original can only be accomplished with the human judgment of a trained operator, and may be unacceptable to the customer.

In order to confirm and insure that the customer is satisfied with the composition and lighting of the photographs taken during the photo-shoot, often, during the photo-shoot the photographer takes an instant photograph of the scene, typically using self-developing film of the type manufactured and sold under the trademark Polaroid by the Polaroid Corporation of Cambridge, Mass., prior to exposing the slide film. However, since both the customer and the photographer know that several corrections and human judgments will be made during the separation process, there has been no motivation to make the Polaroid instant photograph strongly resemble the desired printed product.

Although the theoretical possibility exists for converting reflection originals for accurate reproduction by mechanical processing means, without the trained human who traditionally creates the match, this possibility has not been pursued because:

1. The heavily predominant practice is to use transparency materials for originals. When reflection materials are involved, they are usually pan of a mixed job that also involves transparencies.
2. When reflection materials are intended for color reproduction, they frequently require correction as stated above, and so exact reproduction of the color original is not desirable.
3. The range of colors that can be produced in a particular printing process are the "in gamut" colors, while those outside the process are "out of gamut" colors. Gamut mis-match between original and reproduction, particularly with respect to the extremes of the neutral scale, requires that for good results, even the in-gamut colors must be reproduced without exactly matching conventional colorimetry. Conventional color science does not teach how to deal with this problem effectively.
4. Unless all, or very nearly all, of the images in a job can be processed mechanically, much of the attraction of a mechanized procedure is lost.
5. Since the reflection original cannot be trusted to represent the customer's desires, the advantage of being able to substitute it for a separation proof is lost.

OBJECTS OF THE INVENTION

Accordingly, it is a primary object of the present invention to provide an apparatus for and method of automatically generating a color separation from a reflection original, such as a Polaroid print.

Another object of the invention is to provide an automated system for creating the appearance of a color printed image that is a guaranteed good color match to the appearance of a reflection original image.

And another object of the present invention is to provide an apparatus for and method of automatically generating a color separation from a Polaroid instant photograph.

Still another object of the present invention is to reduce the degree of human judgment required to perform a color separation from a print provided from a photo-shoot.

Yet another object is to provide a pre-press method and apparatus which allows a reflection color original produced by instant photography to function as the prior art proof.

And still another object is to provide a method of and apparatus for generating color separations at reduced cost.

Other objects and advantages of the present invention will become readily apparent to those skilled in this art from the following detailed description wherein a preferred embodiment is shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not restrictive.

SUMMARY OF THE INVENTION

These and other objects are achieved by an improved pre-press process and system for reproducing color images from reflective images. In accordance with the present invention, employing color accurate instant photography, the customer and/or his photographer adjust lighting and exposure at the photography session to achieve approved reflection originals. The photographs are judged under controlled lighting against a standard background in device such as a portable illuminator. Since any deficiencies are corrected by recreating an improved original, the session produces a job output which is 100% suitable for color accurate scanning and separation without the intervention of the pre-press operator. Originals are suitable as proofs for the printer to match. Novel means are employed to achieve rapid, colorimetrically calibrated scanning with standard equipment, and the colorimetry of the prior art is improved to deal effectively with whitepoint and blackpoint misalignment.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE DRAWINGS

Figure 1:
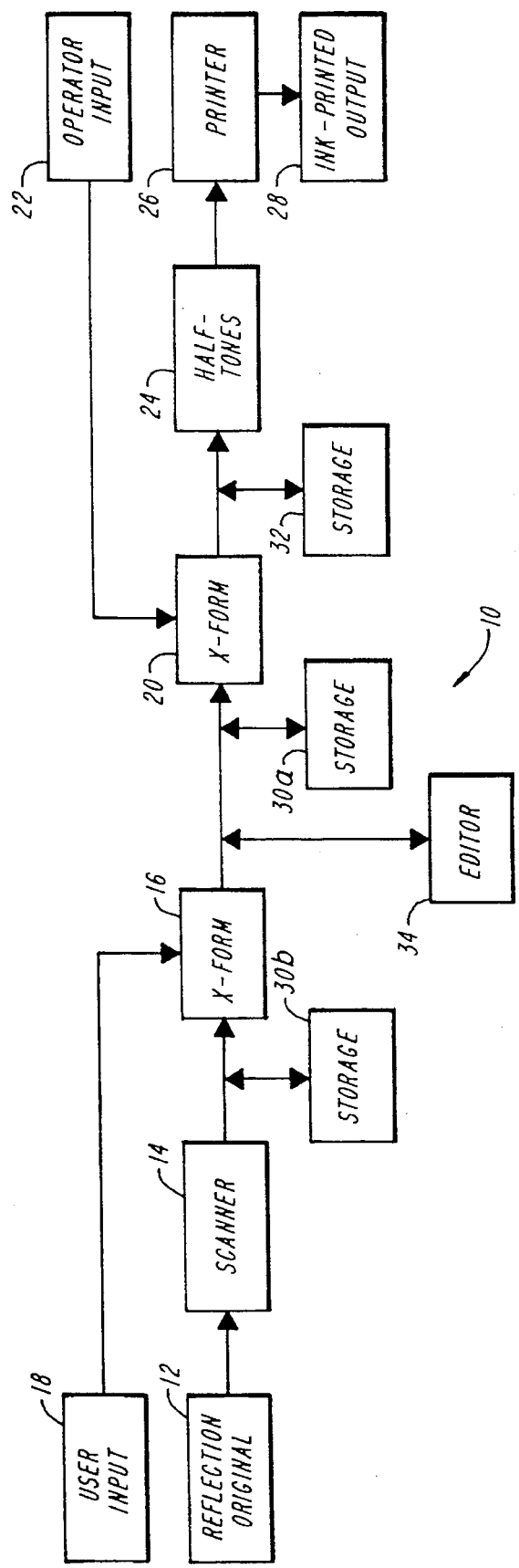
FIG. 1 is a block diagram showing an embodiment of the invention.

FIG. 1 is a block diagram a system 10 used for implementing the present invention for producing an ink-printed color image, indicated as an ink-printed output 28, which has an appearance which is an accurate reproduction of the appearance an original color image of a reflection print 12. The color image of a reflection original color print 12 is the input to system 10. Print 12 may be a photographic print, and is preferably of the instant photographic variety, such as a Polaroid print. In the preferred embodiment, print 12 is taken using Polaroid's color accurate PRO-100 film. Alternatively, print 12 can be an ink-printed image.

The color image provided on print 12 is scanned by an image scanner 14 which generates an electronic representation of the color image on print 12. Scanner 14 generates a digital output representative of a plurality of pixel values of the color image of print 12. One preferred scanner 14 is the Polaroid CS-500 scanner, also sold by the Polaroid Corporation of Cambridge, Mass.

The output of scanner 14 is then fed to a first transform device 16 which applies a predefined transform to the scanner output. The transform, which will be discussed further below, is such that device 16 calculates a set of intermediate values for every pixel in the image. The transform applied by transform device 16 is dependent on the type of reflection original 12 fed into the system and in particular the dyes from the film processes from which the original image is provided. The user input 18 informs the transform device 16 which type of original 12 is being used, and therefore defines which transform device 16 applies.

Preferably, and in accordance with the present invention scanner 14 is calibrated so that the output data of scanner 14 is expressed in terms of the intermediate set of standardized primary colors approximating red, green, blue in a color space as further discussed below. When the scanner is capable of such calibration, and is so calibrated as discussed below, the function of transform device 16 becomes incorporated into the scanner, and is available in the scanner output.

The output of the first transform device 16 is then sent to a second transform device 20, which converts the intermediate values of each pixel provided by the transform device 16 to an output type dependent representation. Transform device 20 also has user input 22, which allows the user to specify which type of printing process will be used to print the final product. As with transform device 16, transform device 20 implements a different transform depending on the particular characteristics of the output printing process to be used. Transform device 20 converts the output of transform device 16 to digital files which can be used by a pre-press house to generate a set of half tone transparencies 24. The half-tone transparencies 24 can then be sent to a printer 26 for generating the final ink-printed product 28.

The system 10 guarantees that the color reproduction provided by the final ink-printed output 28 will substantially resemble the original image of reflection print 12, thereby eliminating the need for traditional proofs. Reflection print 12 functions as the proof, and since print 12 can be a Polaroid instant photograph, the invention eliminates the delay between the photo-session and the production of a proof. If the customer is unsatisfied with a particular Polaroid print, the customer and photographer can adjust the scene and re-shoot until a satisfactory Polaroid instant photograph is produced. Thus at the end of the photo-shoot, the customer can know how the final printed product will look.

Once the print 12 has been produced, the process of generating the color separation is fully automatic, thus system 10 eliminates the need for operator judgmentin producing the color separation. System 10 also eliminates the expensive scanners traditionally used by pre-press houses when performing color separations. The only scanner used by system 10 is scanner 14 which can be a relatively inexpensive color image scanner.

Thus it is feasible for the customer to own scanner 14, and transform devices 16, and 20. Transform devices 16 and 20 can be implemented on an appropriately programmed digital computer, processor or the like, such as desk top computer. In this case, a data storage device 30a (such as a disk drive) can be used to store the output of the transform device 16 on a storage medium such as a disk. The data can then be easily transferred to the pre-press house where it enters the data to a tramform device 20 through a comparable storage and retrieval device so as to generate the half-tone films 24. Alternatively, the pre-press house may own transform devices 16, and 20. In this case the system can include a data storage device 30b for storing the data, for example on a disk provided from the scanner 14. The customer can then send the pre-press house the output of scanner 14. The pre-press house would set the transform devices 16 and 20 through inputs 18 and 22 and automatically generate half-tone transparencies 24. It can also store the data in a storage device 32, similar to devices 30a and 30b. In any case the traditional role of the pre-press house is greatly reduced since operator judgment is eliminated from the process of generating the half-tone transparencies 24.

Typically, the customer will own scanner 14 and the transform device 16 will be integrated as a part of the scanner. The customer may wish to edit the image using a graphics editor 34 of a prior art type comprising graphic editing software packages which typically run on digital computers, shown in FIG. 1, prior to storing the data on a storage device 30*a*. This would eliminate the need for storage device 30*b*.

The calculations performed by scanner 14, and transform device 16, will now be discussed in detail. System 10 provides a guaranteed good match between the appearance of original image 12, and the appearance of reproductions 28 of that image. The desired good match is one that a human observer finds satisfying. That is, a human observer comparing the original image 12, and the printed product 28, should feel that the two images are substantially similar. This definition of a good match is different from the concept of "colorimetric match" which is typically discussed in reference works on color science. While a colorimetric match is an objective criterion based on the physical properties of light reflected from the images, the idea of a good match is a subjective criterion that takes into account how human perception of color and tone is affected by a surrounding image context. In particular, it is necessary to consider how the image context of an area affects the perception of error in its tone or color. As there may be colors and/or aspects of tonal range in an original image, which it is either impossible or undesirable to replicate, it is also necessary to consider which of the infinite variety of possible accon unodations is least likely to yield perceived error in what the user considers to be a "good match".

Both in principle and in practice, objective, mechanizable means of color measurement can guarantee the subjectively identical appearance of two images only under stringently matched viewing conditions. In particular, the brightness, color and perceived source of illumination must be the same for both, and the image surround must be the same, out to the peripheral limits of the observer's field of view.

Since transparency film is designed and optimized for radically different viewing conditions from printed reflection reproductions, different observers can naturally disagree as to what reflection reproduction best matches the transparency. An objective mechanized method of matching transparency originals therefore cannot be defined even in principle. However, this process is easy with reflection originals. Since photographic images and ink-printed images have different properties, it is virtually impossible to produce an ink-printed product that will look exactly like a reflection original under all lighting conditions. Therefore, the concept of a good match implies a standard lighting condition. The preferred choice of standard lighting condition is provided by the well known 5000° K. viewing apparatus. Various types of such viewing apparatus are available from Graphic Technologies, Inc. of Newburgh, N.Y. Therefore, when the user selects a print to function as the proof, the user should view the prints with the viewing apparatus.

Typically, the whitest white and the blackest black achievable with a photographic reflection original 12 will not exactly match those which are achievable by the printing process with the inks, paper and press conditions typically used for reproduction. In addition, some of the most intense colors in the original may fall outside the range, or "gamut", of what can be produced by any available combination of printing inks. Although the whitepoint/blackpoint alignment problem and the intense color problem both deal with misalignment of the original and reproduction gamuts, the perceptual consequences of these two problems are sufficiently different to require two very different solutions.

Broadly, these problems can be addressed either by: 1) clipping, that is, by replacing colors in the original which are outside the reproduction gamut with the "nearest" reproducible one, while leaving in-gamut colors untouched, or by 2) smoothly distorting all the colors in the original, so that a smooth progression of color and tone from one edge of the original gamut through to the opposite edge is matched by a similar transition in the reproduction.

Clipping has the disadvantage of potentially replacing many different colors in the original by the same color in the reproduction, leading to loss of detail and texture in the out-of-gamut material. Also, where the gamut of the reproduction process is larger than that available to the original, a clipping transformation will never put any of that extra range to use.

A smoothly distorting transformation, on the other hand, has the disadvantage of introducing some error into every color in the image, even when the particular, original image happens to contain no non-reproducible colors.

It has been determined in accordance with the present invention that preferably a smoothly defined alteration of all tones in the original is necessary to deal with the whitepoint/ blackpoint alignment problem, while a clipping approach, using a sufficiently sophisticated definition of the "nearest in-gamut color ", works best for handling overly intense colors in the original.

An attempt to create an "objectively correct" ink-printed product 28 might lead one to try to duplicate in a reproduction exactly those luminanee weighted reflectance values found at corresponding points of the original. However, for a photographic original with a 1% reflectance in deepest shadow, and a printing process which gives a minimal reflectance of 3%, for example, this approach would render all shadow detail in the 1% to 3% range of the original as the same featureless black. This "plugging up in the shadow" is both readily visible and unacceptable. Similarly, if the paper is darker than the brightest white of the original, reflectance matching will blow out the highlights.

Alternatively, if the whitest area representing a pure white object in the original is present at a reflectance of 70%, and the paper on which the reproduction is printed has a reflectance of 90%, an exact reproduction of reflectances will be perceived as too dull. If the printing process is capable of a deeper black than can be made within the medium of the original, the failure of objective reflectance matching to utilize this deeper black will not produce the same sense of a defective image, and of a failure to match the original, as with blocking up of shadow or of blowing out the highlight. Still, a reproduction which stretches the tonal range of the reflection original to use the entire range of the reproduction (assuming the image contains at least some deep shadow or other psychological reference "black") is subjectively judged by the user to be superior, even when his announced goal is exact matching.

If the hues of the two blackpoints are not the same, the attempt to duplicate reflectances can lead to a visible color shift going into deep shadow. If the color of the paper being printed is different from "white" as present in the original, an attempt to print a colorimetrically matching white may fail to produce matching appearance due to the visibility of any surrounding unprinted paper. An attempt to shift the white definition provided by the paper also runs into color problems where a bright white pushes toward 0% printing dot, as the screens will not drop out together.

To handle these problems, whitepoint and blackpoint determinations (along with color measurements to be described later) must be made for each type of film used for originals, and for each significantly different category of press reproduction. By coupling input to output through a standardized electronic image representation, characterization of the two sides can be treated separately through transform devices 16 and 20. When scanning an original, then, the only user input through input 18 is a single discrete choice, indicating the film type to transt brm device 16. After the user combines this image with text, graphics, and other images to form a complete "electronic document", he or she (or a properly equipped printer or service bureau) "separates" the document for printing, using software which generates the necessary printing screens of half tones 24 in a manner responsive to the requirements of the printing process. Again, during this output process, the only operator provided information provided through input 22 to transform device 20 is a selection of the press type, ink, and paper being targeted.

Preferably, whitepoint, blackpoint, and all other color measurements referred to herein are to be made with standard colorimetry apparatus, and are referred to here (unless otherwise stated) in terms of energy proportional tristimulus values "X", "Y", and "Z", or in terms of the conunoniy employed chromaticity ratios x=X/(X+Y+Z) and y=Y/(X+Y+Z). The illuminant employed must be of constant intensity and color.

The best possible subjective match between original and reproduction has been found to occur when the following relations are true for every pixel of the original image and the corresponding pixel of ink-printed output image 28.

$$\frac{X_O - X_{OK}}{X_{OW} - X_{OK}} = \frac{X_R - X_{RK}}{X_{RW} - X_{RK}} \quad (1a)$$

$$\frac{Y_O - Y_{OK}}{Y_{OW} - Y_{OK}} = \frac{Y_R - Y_{RK}}{Y_{RW} - Y_{RK}} \quad (1b)$$

$$\frac{Z_O - Z_{OK}}{Z_{OW} - Z_{OK}} = \frac{Z_R - Z_{RK}}{Z_{RW} - Z_{RK}} \quad (1c)$$

wherein $X_O$, $Y_O$, and $Z_O$ represent the tristimulus values of any pixel of an original image;

$X_R$, $Y_R$, and $Z_R$ represent the tristimulus values of the corresponding pixel of the image on its reproduction;

$X_{OK}$, $Y_{OK}$, $Z_{OK}$ and $X_{RK}$, $Y_{RK}$, $Z_{RK}$ represent the tristimulus values of the blackpoints of original and reproduction images, respectively; and $X_{OW}$, $Y_{OW}$, $Z_{OW}$ and $X_{RW}$, $Y_{RW}$, $Z_{RW}$ are the tristimulus values of the whitepoints of original and reproduction images, respectively.

All measurements are taken under the same intensity of the same reference illuminant.

In equations (1a–c), the X, Y, and Z values are preferably expressed in accordance with the well known Commiteé International D'Éclariarge (CIE) standard tristimulus curves. As those skilled in the art will appreciate, these X, Y, and Z values are related to the visual sensing elements of the human retina. Preferably, the illuminant used should match the 5000° K. standard widely used in the viewing apparatus mentioned above. Preferably, tristimulus values are integrated from the tristimulus curves of the CIE 1964 10° observer, due to the greater sensitivity of the eye to image color errors at this larger subtense. The basic characterstics of different subtractive ink and dye sets are sufficiently similar, however, that equipment based upon the more widely used 1931 2° observer is also satisfactory. Thus, by insuring that Equations (1a–c) are true for every pixel, system 10 insures that the appearance of the image ink-printed output 28 will be a good match to the appearance of the image of the input print 12.

Images satisfying these conditions may be termed "matched by endpoint aligned colorimetry". This form of colorimetry provides a novel objective, mechanizable, and effective specification for image matching. In particular, colorimetric, and other objective, mechanizable forms of image matching in the prior art do not deal with blackpoint alignment, although some form of it has long been known to be necessary in practical image reproduction. Colors for which these conditions cannot be satisfied are "out of gamut" with respect to the matching definition of Equations (1a–c), in conjunction with the film type and printing process in question. The phrase "out of gamut", as further used here, is used in this sense.

While the relationships of Equations (1a–c) have been established empirically, it is helpful to understand, as best as possible, why they should take this particular form. Illumination intensity varies greatly from one part of a typical scene to another. Color varies as well; even when there is only one light source. Indirect reflections tend to have different color from the directly incident light, and the mix varies from place to place. Since the eye and brain are excellent at ignoring this effect when perceiving object color, it can be understood that if an object in different representations of the same image is to be perceived the same way, the whitepoint of each representation must be scaled to be consistent with the immediately surrounding context. That the best correction for differing blackpoints is a simple subtraction of apparent blackpoint energy may seem more surprising, especially in view of the many highly non-linear relationships in the psychophysics of vision. There is a diffuse scattering of light within the human eye, however, which adds about 2% of the average scene intensity to all points of the retinal image. For the live scenes with which we mostly contend, however, 2% of "average scene intensity" can vary from much less than 2% of object white, for a mostly dark field of view, to much more than 2% of object white, for a field of view which includes the glare of one or more bright illumination sources. Furthermore, since the exposure of different parts of the retina to other, differently illuminated parts of the eye's interior must vary with retinal location and the distribution of scene brightness, the diffuse fill must vary some from one area to another. Thus the brain's ability to perceive a constant object black must require the equivalent of a scene and context dependent offset subtraction. This explains how a printed "black" can have several percent reflectance and still be a subjectively satisfying black, so long as nothing blacker is nearby (in particular, nothing blacker is perceived to be on the satne surface). It may also explain why, for matching purposes, the residual black reflectance is best treated as though it were a diffuse fill throughout the image.

Blackpoints are defined by the colorimetry of the darkest area a process can render when attempting to produce a high quality black. For a photograph, this normally corresponds to a completely unexposed region of the original image, while for four color printing, it corresponds to a neutral tone at the Under Color Removal (UCR) limit. The whitepoint of the printed reproduction is taken as a defined fraction, such as for example, 90%, of the tristimulus values of the unprinted medium upon which the image is printed. The fractional reduction allows detail to be held in highlight areas without screen dropout, and preserves the character of specular highlights on light toned surfaces. It may be adjusted in accordance with the capabilities of the specific printing process being characterized. For the original, the whitepoint is taken to have the chromaticity of the background against which the originals are viewed, selected, and with the preferred use of instant photography, the originals are also preferably adjusted by the customer. This viewing background is preferably a piece of standard commercial grade proofing stock, against which the images are placed in a portable 5000° K. viewing booth. The luminance tristimulus value $Y_{RW}$ is taken from the brightest white at which the film type of the original can hold acceptable highlight detail, then the other two tristimulus values are calculated by combining this datum with the previously measured chromaticities of the background used.

As described above, the digital electronic signals, as provided by the output of the scanner 14, are preferably standardized so as to facilitate the solving of equations (1a–c). The standardized representation should facilitate storage of images over time, and communication of images from a user who scans them and forwards them to a service bureau that prints them. It should also allow the use of popular software tools for image editing, compression, etc. without extra file translations. In order to provide the standardized values for the pixels of the image, it is necessary to perform at least one, and preferably two transformations, as generally described above.

As generally described above and more specifically described below, the digital data representing the image is preferably defined in terms of a linear additive red, green and blue color space. Accordingly, the X, Y and Z values must be converted to the primary color component values. More particularly, the representation of the color of a pixel is therefore defined by specifying the normalized value of the three additive primary colors, hereinafter referred to as R', G', and B' (where the value R' represents the normalized value of the primary red component, the value G' represents the normalized primary green component, and the value B' represents the normalized primary blue component) which will add together to provide the designated color.

As will become more evident hereinafter, it is preferable for the standard image space to be an R', G', B' space rather than normalized values of an X', Y', Z' space, because images represented in the R', G', B' space can be edited with popular prior art software tools for image editing, compression, etc. without extra file transformations. Further, the R', G', B' space provides a standard representation that facilitates the storage of images over time, and the communication of images from a customer who scans them, and forwards the data to a service bureau that prints the images from the data.

Two primary considerations influence the choice of using primary color component values:

1. The desire to represent all reproducible colors. This may require the use of primary color values somewhat more saturated than can exactly match CRT phosphors.
2. The desire to match the chromaticities of the CRT phosphors widely in use, at least approximately, so that popular image editing software may be used on stored images without further file conversions.

Within any latitude that remains, these secondary considerations apply:

1. The desire to minimize the computational burden in capturing image data from some predominant image source, such as a heavily used scanner type.
2. The desire to maintain archival compatibility with a previous standard.

Once the primary component values have been selected, a transformation between X, Y, Z space and R', G', B' space can be developed. In developing this transformation it is useful to first define a normalized intermediate X', Y', Z' space with respect to each pixel as defined by the following equations (2a–c) wherein:

$$X' = \frac{X - X_K}{X_W - X_K}, \quad (2a)$$

$$Y' = \frac{Y - Y_K}{Y_W - Y_K}, \quad (2b)$$

$$Z' = \frac{Z - Z_K}{Z_W - Z_K}, \quad (2c)$$

wherein
X, Y and Z are the measured tristimulis values of the original image,
$X_K$, $Y_K$ and $Z_K$ represent the values of the blackpoint of the original image, and
$X_W$, $Y_W$ and $Z_W$, represent the values of the whitepoint of the original image, all of the values preferably being measured using standard colorimetry apparatus.

A transformation from X', Y', Z' space to R', G', B' space preferably is of the form of a three by three matrix M1, where M1 satisfies the following equation (3).

$$\begin{bmatrix} R' \\ G' \\ B' \end{bmatrix} = M1 \begin{bmatrix} X' \\ Y' \\ Z' \end{bmatrix} \quad (3)$$

The elements of matrix M1 will be specified further below.

Prior to storage of an image as a digital computer file, the R', G', B' values are preferably normalized and gamma encoded. In one embodiment, the file storage parameters $R_{file}$, $G_{file}$ and $B_{file}$, are represented as unsigned 8-bit bytes. The parameters $R_{file}$, $G_{file}$ and $B_{file}$ are then given by the following equation (4):

$$R_{file}=255(fR')^{\gamma_f}, G_{file}=255(fG')^{\gamma_f}, B_{file}=255(fB')^{\gamma_f} \quad (4)$$

wherein
the whitepoint is f times the energy of the maximum code,
$\gamma_f$ represents the gamma encoding, and
final values for $R_{file}$, $G_{file}$ and $B_{file}$ are rounded to the nearest integer.

Further, values larger than 255 are clipped at 255, and values less than zero are clipped to zero. A preferred choice for $\gamma_f$ is 0.4545 which provides compensation for displays with a gamma of 2.2, and therefore closely approximates common digital image standards, although other values can be used. Preferably, f is 0.900, providing an 11% overrange capability in any highlights. A range of values for f may be successfully used so long as a single value is consistently observed.

The scanner 14 must be calibrated via transform device 16 so that scanner 14 and transform device 16 provide output data in the form of the standard color space. Unfortunately, the great majority of image input scanners, and of other sources of digital images, are not colorimetrically calibrated. Typically, a set of square cut separation filters is employed to provide an approximate RGB representation. Since the capture process thereby employs a set of taking sensitivities which are not linear combinations of the CIE tristimulus curves, a colorimetric calibration is not possible for a broad class of source materials. For a single image medium, however, there is a specific set of three image forming dyes, and thus a one-to-one relation between the scanner readings, the dye densities, and the colorimetry of each point in the image. A separate colorimetric calibration is thus possible (within the limits of equipment stability) for each type of image medium to be used.

In the preferred embodiment, a colorimetric calibration is preformed for each and every type of original reflection print 12 that will be provided at the input to system 10. Such a calibration can be approached in a number of ways. Each starts with a calibration image (or images) in the medium in question, such image consisting of many different uniform color swatches, evenly sparming the gamut of the medium. One preferred calibration image for use in calibrating Polaroid PRO100 film is provided in the Kodak Q60 Scanner Alignment Kit.

These swatches are first measured to determine their tristimulus X, Y, Z values using standard colorimetry apparatus. As will be described further below, the X, Y, Z values can be used to compute the corresponding standardized image space values, R , G', and B'.

Once the R', G', and B' values have been computed for each swatch on the calibration image, the calibration image is scanned to determine the r, g and b values returned by the scanner. Next an optimization is performed to find an optimum transform between the r, g, b, space output by the scanner, and the standard image space, R, G', and B'.

In one method of determining the optimum transform, a very large number of swatches are prepared and measured, and the results are used to create a look-up table which relates r, g and b values as input to the desired R', G' and B' values as an output. High order input bits may be used to build the table address, while low-order bits are used for interpolation. Known methods, extended by the novel use of endpoint aligned colorimetry, may be used to accomplish this.

In the preferred method, blackpoint values $R_K$, $G_K$, $B_K$, whitepoint values $R_W$, $G_W$, $B_W$, neutral correction exponent values $\gamma_R$, $\gamma_G$, $\gamma_B$, and matrix M2, are determined in a best fit manner, such that the following simplified transformations of equations (5) and (6) may be applied.

$$\begin{bmatrix} R \\ G \\ B \end{bmatrix} = M2 \begin{bmatrix} r \\ g \\ b \end{bmatrix} \quad (5)$$

$$R' = \left( \frac{R - R_K}{R_W - R_K} \right)^{\gamma_R}, G' = \left( \frac{G - G_K}{G_W - G_K} \right)^{\gamma_G}, \quad (6)$$

$$B' = \left( \frac{B - B_K}{B_W - B_K} \right)^{\gamma_B}$$

In a preferred refmement of this method, to avoid redundant setting of the whitepoint, and more parameters than necessary in the fit, the matrix M2 is required to have row sums of unity. This reduces it to six degrees of freedom, and forces it to preserve the brightness and color (or rather, lack of it) of the neutral scale. In this method, the matrix M2 is preferably given by the following equation (7):

$$M2 = \begin{bmatrix} R_r & R_g & R_b \\ G_r & G_g & G_b \\ B_r & B_g & G_b \end{bmatrix} = \begin{bmatrix} (1-R_g-R_b) & R_g & R_b \\ G_r & (1-G_r-G_b) & G_b \\ B_r & B_g & (1-B_r-B_g) \end{bmatrix} \quad (7)$$

The best fit parameters are given by the following procedure:

1. Given the current best estimate of M2, (which may initially be the identity matrix) calculate the values of $R_W$, $G_W$ and $B_W$, and $R_K$, $G_K$ and $B_K$;
2. Using measurements from a full gray scale of swatches, preferably equally spaced for CIELAB "L", find the values of $\gamma_R$, $\gamma_G$, $\gamma_B$, yielding the least sum of squares of errors in $\Delta E$ (where $\Delta E$ is defined in terms of the CIELAB standard);
3. Using the full set of measurements, find that M2 yielding the least sum of squares of errors in $\Delta E$; and
4. Repeat the above three steps until there is no further significant change in the calculated parameters.

The multi-dimensional optimizations required in steps 2 and 3 may be performed by any of a variety of techniques. The "downhill simplex" method, as described by Press, et al. in *Numerical Recipes in C* (Cambridge University Press, 1988), is preferred for its simplicity and robustness, and has been successfully used to achieve rapid results on an inexpensive personal computer. It is necessary to perform the optimizations of steps 2 and 3 separately, as the standard CIELAB $\Delta E$ calculation which is to be employed does a rather poor job of capturing the objectionability of color error in an image context (it is primarily intended to deal with the perceptibility of color difference in a swatch comparison context). In particular, $\Delta E$ alone understates the both relative visibility and objectionability of color errors near neutral. By separating step 2, which corrects the gray balance, from step 3, which corrects more saturated colors, this problem is effectively minimized.

One advantage of this method is that the calculations required by equations (5) and (6) can be merged into single uninterpolated lookup tables for each color component. Further, this method can be implemented on existing scanners, such as the preferred Polaroid CS-500, such that processing the image into standard form does not require any separate software procedures. This facilitates the use of popular pre-existing image capture environments, such as Adobe's PhotoShop. Also, even with the computations required by equation (5), this method is less computationally intensive than other methods.

In yet another method of performing the optimization, the first two methods are combined in reverse order. An intermediate estimate of R, G, B is further refined by interpolated table look-up. Due to the relatively high accuracy of the intermediate estimate, this table may have many fewer entries (and be derived from many fewer swatch measurements) than called for by the first method.

One preferred choice for M2 and $\gamma_R$, $\gamma_G$, $\gamma_B$, for use with the Polaroid CS-500 scanner and Polaroid PRO100 film are as follows.

$$M2 = \begin{bmatrix} 1 & 0 & 0 \\ -0.19 & 1.33 & -0.14 \\ -0.059 & -0.29 & 1.35 \end{bmatrix} \quad (8)$$

$$\gamma_R = 0.46, \gamma_G = 0.45, \gamma_B = 0.48 \quad (9)$$

Once scanner 14 has been properly calibrated as described above, scanner 14 effectively transforms input image 12 into a representation within the standard R', G', B' space. The additional calculations of equation (4) can also be programmed into scanner 14 so that the output of the scanner 14 includes digital file representations of the input image 12 in the form of $R_{file}$, $G_{file}$, $B_{file}$. This facilitates the use of popular image editing software, thus allowing customers in the preferred embodiment to edit the output of scanner 14 with editor 34 prior to feeding the data to transform device 18.

The transformation between R', G', B' space and X', Y', Z' space will now be discussed. The transformation from unnormalized X, Y, Z space to R', G', B' space is in the form of a three by three matrix M3 such that M3 satisfies the following equation (10):

$$\begin{bmatrix} X \\ Y \\ Z \end{bmatrix} = M3 \begin{bmatrix} R' \\ G' \\ B' \end{bmatrix} \quad (10)$$

where M3 is of the form given by the following equation (11).

$$M3 = \begin{bmatrix} X_R & X_G & X_B \\ Y_R & Y_G & Y_B \\ Z_R & Z_G & Z_B \end{bmatrix} \quad (11)$$

As can be seen from equation (11), the columns of M3 define the tristimulus values of the set of three additive primaries with respect to which image color is encoded. Therefore, once the primary colors R', G', B' have been selected, the matrix M3 is completely constrained.

Matrix M3 must be normalized to provide a transformation between R', G', B' space and X', Y', Z' space. This normalization is accomplished by use of a diagonal three by three matrix M4, which represents the tristimulus values of the standard 5000° K. illuminant, where M4 is given by the following equation (12).

$$M4 = \begin{bmatrix} X_{W5K} & 0 & 0 \\ 0 & Y_{W5K} & 0 \\ 0 & 0 & Z_{W5K} \end{bmatrix} \quad (12)$$

The matrix M5 which is equal to the inverse of (M4)(M3) provides the desired transformation from R', G', B' space to X', Y', Z' space. Further, the reverse transformation from X', Y', Z' space to R', G', B' space referred to as M1 in equation (3) is given by the inverse of M5.

The values calculated by device 16 are then fed to transform device 20 which generates the color separation. In general, a transformation between a defined additive color space and a color separation for a known printing process can be developed by known techniques given the following additional considerations: end point aligned colorimetry in accordance with equations (2a–c) must be applied to printed calibration swatches, and the colorimetry for the standardized image input files to which such swatches are to correspond must be interpreted using matrix Ms. Since most offset printers use the cyan, yellow, magenta, black (CYMK) printing process, the output of device 20 is generally in the form of four digital files such that each file corresponds to the four printing inks. Other printing processes may be used, as long as the type of process is well characterized. The type of printing process used is specified by input 22.

Since all the matrices and variables required for the calculations performed by scanner 14, transform device 16, and transform device 20, can be precalculated as described above, the process of transforming an input image to a color separation is entirely automatic, i.e., no human judgment is required. The system 10 further guarantees that the final ink-printed product 28 generated from the color separation produced by device 20, will be a good match to the original input image 12.

Since certain changes may be made in the above apparatus without departing from the scope of the invention herein involved, it is intended that all matter contained in the above-description or shown in the accompanying drawing shall be interpreted in an illustrative and not in a limiting sense.

What is claimed is:

1. A system for reproducing a color image on a reproduction medium in accordance with a reproduction process of an original color image provided on a reflection medium so that said reproduced color image appears the same as said original color image regardless of said mediums, said system comprising:

means for scanning the color image provided on the reflection original medium so as to provide data representative of pixels of the image, each pixel having determinable reflectance values for preselected color components, and the original medium having determinable reflecting values for said preselected color components of a blackpoint and whitepoint:

first standardization means for standardizing said data as a function of the reflectance values of each said pixel for said preselected color components so as to provide a first set of transformed data, said first standardization means including means for defining a transform as a function of reflectance values of said first medium, said means for defining a transform as a function of reflectance values of said first medium including means for defining said transform as a function of the reflectance values of the blackpoint and whitepoint of each of said pixels;

second standardization means, responsive to said first set of transformed data, for standardizing said first set of transformed data as a function of the reproduction process so as to provide a second set of transformed data; and means, responsive to said second set of transformed data, for reproducing said image on said reproduction medium in accordance with said reproduction process.

2. A method of producing an ink-printed reproduction of an original reflective input image, the method including the steps of:

A. determining a whitepoint and a blackpoint of an input process used to produce the input image, B. selecting a priming process for producing the reproduction, and determining a whitepoint and a blackpoint of the printing process, C. determining a transformation to be applied to said input image to generate said printed reproduction, such that colorimetric measurements made of corresponding points on said input image and said reproduction substantially satisfy the mathematical equations:

$$\frac{X_O - X_{OK}}{X_{OW} - X_{OK}} = \frac{X_R - X_{RK}}{X_{RW} - X_{RK}},$$

$$\frac{Y_O - Y_{OK}}{Y_{OW} - Y_{OK}} = \frac{Y_R - Y_{RK}}{Y_{RW} - Y_{RK}},$$

$$\frac{Z_O - Z_{OK}}{Z_{OW} - Z_{OK}} = \frac{Z_R - Z_{RK}}{Z_{RW} - Z_{RK}}$$

in which $X_O$, $Y_O$, and $Z_O$ represent the tristimulus values of a point on said input image, $X_R$, $Y_R$ and $Z_R$ a represent the tristimulus values of the corresponding point on said reproduction, $X_{OK}$, $Y_{OK}$, $Z_{OK}$ and $X_{RK}$, $Y_{RK}$, $Z_{RK}$ are the tristimulus values of the blackpoints of the input and reproduction processes, respectively, and $X_{OW}$, $Y_{OW}$, $Z_{OW}$ and $X_{RW}$, $Y_{RW}$, $Z_{RW}$ are the tristimulus values of the whitepoints of input and reproduction processes, respectively.

3. A method of producing an ink-printed reproduction of an original reflective input image, the method including the steps of:

A. determining a whitepoint and a blackpoint of an input process used to produce the input image;

B. selecting a printing process for producing the reproduction, and determining a whitepoint and a blackpoint of the printing process;

C. optically scanning the reflective input image and generating for each point scanned, in accordance with an input transformation, a first triad of values R', G', B', which triad is a function of a second triad X', Y', Z', wherein the values of said second triad are defined by the mathematical equations:

$$X' = \frac{X_O - X_{OK}}{X_{OW} - X_{OK}},$$

$$Y' = \frac{Y_O - Y_{OK}}{Y_{OW} - Y_{OK}},$$

$$Z' = \frac{Z_O - Z_{OK}}{Z_{OW} - Z_{OK}}$$

in which $X_O$, $Y_O$, and $Z_O$ represent the tristimulus values for the point in question on the input image, $X_{OW}$, $Y_{OW}$, and $Z_{OW}$ represent the tristimulus values of the input process whitepoint, and $X_{OK}$, $Y_{OK}$, and $Z_{OK}$ represent the tristimulus values of the input process blackpoint;

D. using the triads output from said first transformation as input to a second transformation, which second transformation drives said printing process to generate the ink-printed reproduction such that the tristimulus values $X_R$, $Y_R$, and $Z_R$ of a point in this reproduction are substantially those given by the mathematical equations:

$$X_R = X'(X_{RW} - X_{RK}) + X_{RK}, \; Y_R = Y'(Y_{RW} - Y_{RK}) + Y_{RK}, \; Z_R = Z'(Z_{RW} - Z_{RK}) + Z_R$$

in which

X', Y', and Z' represent said second triad corresponding to said first triad previously developed by the first transformation to represent the color at the reproduction point in question, $X_{RW}$, $Y_{RW}$, and $Z_{RW}$ represent the tristimulus values of the printing process whitepoint, and $X_{RK}$, $Y_{RK}$, and $Z_{RK}$ represent the tristimulus values of the printing process blackpoint.

4. A method as in claim 3, wherein said step of optically scanning the reflective input image and generating for each point scanned, generates each point scanned in accordance with said input transformation, the first triad of values R', G', B' being substantially equal to said second triad of values X', Y', Z'.

5. A method as in any one of claims 4, wherein said step of optically scanning the reflective input image and generating for each point scanned, generates each point scanned in accordance with said input transformation, the first triad of values R', G', B' being substantially equal to a nonlinear encoding.

6. A method as in claim 5, wherein said step of optically scanning the reflective input image and generating for each point scanned, generates each point scanned in accordance with said input transformation, the first triad of values R', G', B' being substantially equal to a gamma encoding.

7. A method as in claim 3, wherein said step of optically scanning the reflective input image and generating for each point scanned, generates each point scanned in accordance with said input transformation, the first triad of values R', G', B' being substantially equal to a non-singular 3 by 3 linear matrix transformation of said second triad.

8. A method as in any one of claims 7, wherein said step of optically scanning the reflective input image and generating for each point scanned, generates each point scanned in accordance with said input transformation, the first triad of values R', G', B' being substantially equal to a nonlinear encoding.

9. A method as in claim 8, wherein said step of optically scanning the reflective input image and generating for each point scanned, generates each point scanned in accordance with said input transformation, the first triad of values R', G', B' being substantially equal to a gamma encoding.

10. A method as in any one of claims 3, wherein said step of optically scanning the reflective input image and generating for each point scanned, generates each point scanned in accordance with said input transformation, the first triad of values R', G', B' being substantially equal to a nonlinear encoding.

11. A method as in claim 10, wherein said step of optically scanning the reflective input image and generating for each point scanned, generates each point scanned in accordance with said input transformation, the first triad of values R', G', B' being substantially equal to a gamma encoding.

* * * * *

UNITED STATES PATENT AND TRADEMARK OFFICE
CERTIFICATE OF CORRECTION

PATENT NO. : 5,572,340
DATED : November 5, 1996
INVENTOR(S) : Richard Eckhardt, et al.

It is certified that error appears in the above-indentified patent and that said Letters Patent is hereby corrected as shown below:

Claim 2, column 14, line 43, delete "Y", third instance, and substitute therefor -- Z --; and line 52, delete "a".

Signed and Sealed this

Twenty-fifth Day of February, 1997

Attest:

BRUCE LEHMAN

*Attesting Officer*      *Commissioner of Patents and Trademarks*